(12) United States Patent
Mizutani et al.

(10) Patent No.: US 6,771,404 B2
(45) Date of Patent: Aug. 3, 2004

(54) HOLOGRAM SCREEN

(75) Inventors: Yasuhiro Mizutani, Inabe-gun (JP); Kazunori Suzuki, Nagoya (JP)

(73) Assignee: Denso Corporation, Kariya (JP)

( * ) Notice: Subject to any disclaimer, the term of this patent is extended or adjusted under 35 U.S.C. 154(b) by 50 days.

(21) Appl. No.: 10/034,115

(22) Filed: Jan. 3, 2002

(65) Prior Publication Data

US 2002/0089710 A1 Jul. 11, 2002

(30) Foreign Application Priority Data

Jan. 9, 2001 (JP) .................................... 2001-001745
Nov. 13, 2001 (JP) .................................... 2001-347934

(51) Int. Cl.$^7$ .................................................. G02B 5/32
(52) U.S. Cl. .................................... 359/15; 359/599
(58) Field of Search .................................... 359/15, 599

(56) References Cited

U.S. PATENT DOCUMENTS 4,840,444 A * 6/1989 Hewitt ........................ 359/3
5,724,161 A * 3/1998 Smith et al. ................ 359/13
6,288,803 B1 * 9/2001 Hattori et al. .............. 359/15

FOREIGN PATENT DOCUMENTS

| EP | 0935159 A2 | * 8/1999 |
|---|---|---|
| JP | 63-172259 | 7/1988 |
| JP | 4-107278 | 9/1992 |
| JP | 9329759 | * 12/1997 |
| JP | 11-202417 | 7/1999 |

* cited by examiner

Primary Examiner—Mark A. Robinson
Assistant Examiner—Alessandro Amari
(74) Attorney, Agent, or Firm—Nixon & Vanderhye P.C.

(57) ABSTRACT

A hologram screen is produced by using a transmission-type hologram film, permitting images to be seen from the side of the projector. The hologram screen has a transparent member and a hologram film stuck to the transparent member, and produces the image by projecting image-forming light from the projector. The hologram film is of the transmission-type. The hologram screen also has a reflector for reflecting the image-forming light arranged on the back surface side of the hologram film.

8 Claims, 12 Drawing Sheets

HOLOGRAM SCREEN

BACKGROUND OF THE INVENTION

1. Field of the Invention

The present invention relates to a hologram screen for producing full-color or monochromatic still image or moving image by projecting image-forming light.

2. Related Art

Figure 15A:
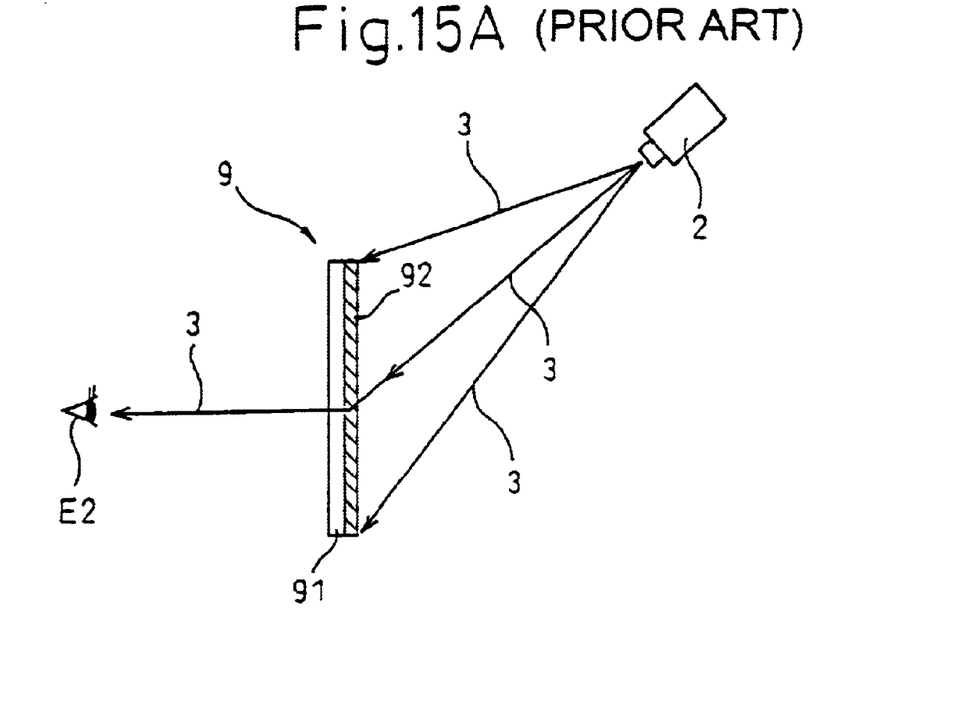
FIG. 15A is a sectional view illustrating a transmission-type hologram screen.
Figure 15B:
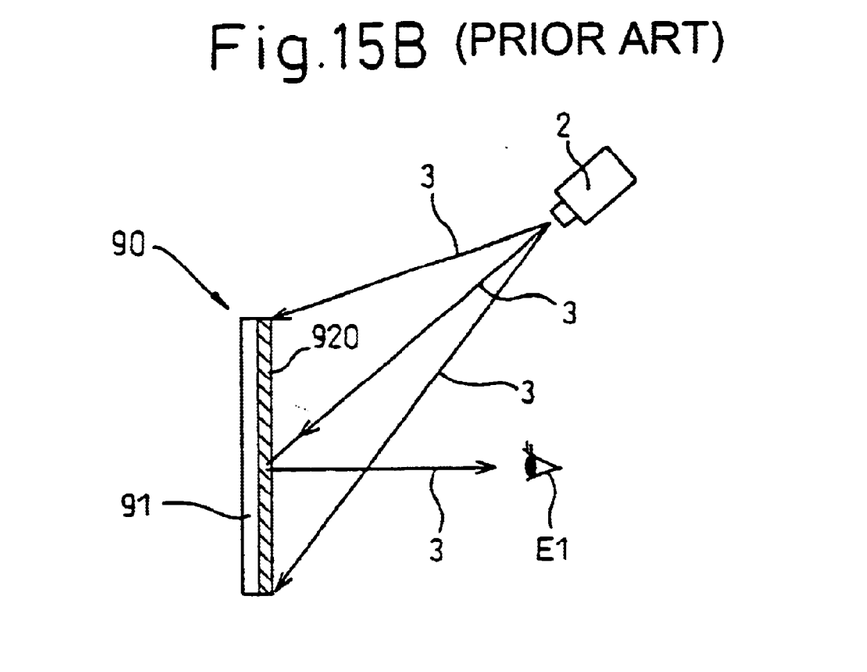
FIG. 15B is a sectional view illustrating a reflection-type hologram screen.

There has heretofore been known a hologram screen for producing advertisements such as of moving image or still image by sticking it onto a show window or the like, and projecting image-forming light 3 from a projector 2 as shown in FIGS. 15A and 15B.

The hologram screens can roughly be divided into a transmission-type hologram screen 9 which permits the image-forming light 3 to pass through as shown in FIG. 15A and a refection-type hologram screen 90 which reflects the image-forming light 3 as shown in FIG. 15B.

That is, the transmission-type hologram screen 9 shown in FIG. 15A comprises a transparent member 91 and a transmission-type hologram film 92 stuck to the transparent member 91, and the reflection-type hologram screen 90 shown in FIG. 15B comprises a transparent member 91 and a reflection-type hologram film 920 stuck to the transparent member 91.

The transmission-type hologram screen 9 and the reflection-type hologram screen 90 are used depending upon their respective applications. Namely, the transmission-type hologram screen 9 is used in an application where a viewer E2 views the image from the side opposite to the projector 2 as shown in FIG. 15A. This can be represented by, for example, the one where advertisements are to be displayed in front of the shop.

On the other hand, the reflection-type hologram screen 90 is used in an application where a viewer E1 views the image from the side of the projector 2 as shown in FIG. 15B. This can be represented by, for example, one where advertisements are to be displayed inside the shop.

Demands, in the market, are increasing for both of these hologram screens.

However, production of the above-mentioned hologram films 92 and 920 requires precise and large-scale optical systems for exposure to light as well as a highly sophisticated technology. Besides, the transmission-type hologram film 92 and the reflection-type hologram film 920 are produced requiring different kinds of optical systems for exposure to light and different kinds of production technology. Therefore, it is difficult to produce both the transmission-type hologram film 92 and the reflection-type hologram film 920, and a tremendously large cost of investment and cost of development are needed if both of them are to be produced.

It has therefore been desired to produce not only the transmission-type hologram screen but also the reflection-type hologram screen by using the transmission-type hologram film 92.

SUMMARY OF THE INVENTION

The present invention was accomplished in view of the problems inherent in the above prior art, and its object is to produce a hologram screen that can be easily produced by using the transmission-type hologram film enabling the image to be seen from the side of the projector.

The present invention is concerned with a hologram screen having a transparent member and a hologram film stuck to the transparent member and producing image by projecting image-forming light from a projector, wherein:

the hologram film is a transmission-type hologram film; and a reflector for reflecting the image-forming light is arranged on the back surface side of the hologram film.

In the present invention, what draws the greatest attention is that the hologram film is the transmission-type hologram film, and that a reflector for reflecting the image-forming light is arranged on the back surface side of the transmission-type hologram film.

The reflector may be the one which totally reflects the image-forming light or may be the one which permits part of the image-forming light to pass through.

In connection with the hologram film and the like in this specification, the side on where the projector is arranged is referred to as "front surface side" and the opposite side is referred to as "back surface side".

Further, the projector is, for example, a liquid crystal projector, and the image may be, for example, a full-color or monochromatic still image or moving image.

The hologram film may be directly stuck to the transparent member, or may be stuck to the transparent member via any other member such as the above-mentioned reflector or the like. The reflector may be directly stuck to the back surface of the hologram film (see embodiment 1) or may be stuck to the back surface of the transparent member (see embodiment 2).

Next, the operation and advantage of the invention will be described.

The above-mentioned hologram film is a transmission type hologram film. Therefore, when an image light is projected from an upper diagonal direction onto the hologram film, for example, the image light is diffracted and scattered on the hologram film to pass therethrough in a substantially horizontal direction.

Since the reflector is arranged on the back surface side of the hologram film, the image-forming light passing through the hologram film is reflected in a substantially horizontal direction.

Therefore, the image light travels to the front surface side of the hologram screen. Thus, a viewer at the front surface side of the hologram screen can see the image.

As such, since the hologram screen is constructed of the transparent-type hologram film stuck to the transparent member, the image can be recognized from the side of the projector. Therefore, even though the transparent-type hologram film is employed, the hologram screen functions as a reflection-type hologram screen.

On the other hand, the hologram screen can be used as a transparent-type hologram screen by which an image can be recognized at the side opposite to the projector. That is, by using a hologram film for manufacturing a transparent-type hologram screen, the hologram film having a reflecting function can be easily manufactured.

Therefore, there is no need of making an investment or developing the technology for particularly producing the reflection-type hologram screen, and the hologram screen can be cheaply produced.

Besides, the background light from the side opposite to the viewer passes through the hologram screen to some extent provided the reflector is not the one which totally reflects light. Therefore, the viewer is allowed to see, as a background, the opposite side of the hologram screen.

According to the present invention as described above, the hologram screen can be easily produced by using the transmission-type hologram film, the hologram screen enabling the image to be seen from the side of the projector.

Figure 9:
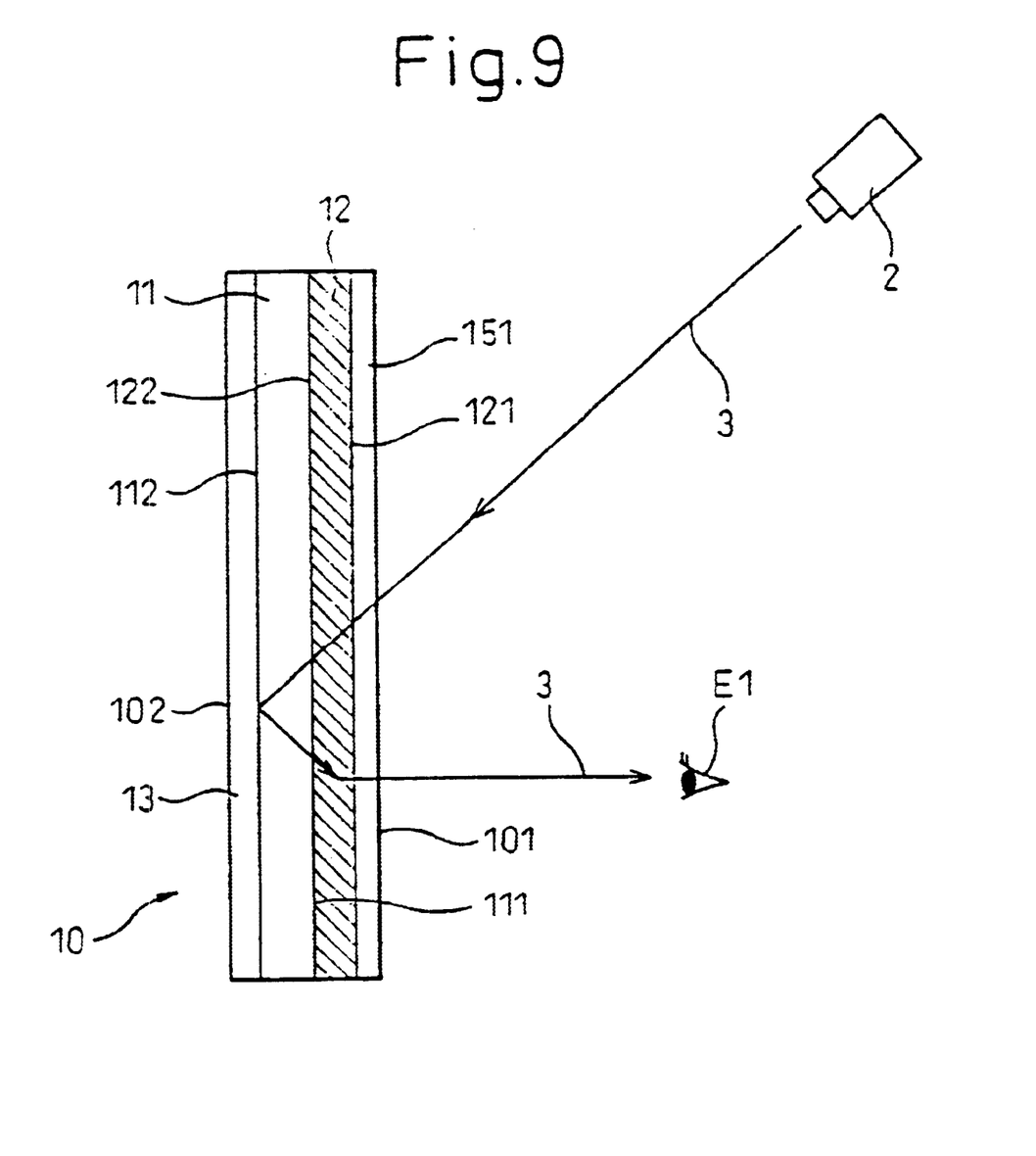
FIG. 9 is a sectional view illustrating the hologram screen according to an embodiment 4.

According to the second aspect of the present invention, the hologram film may be so arranged as to produce an image on the front surface side of the hologram screen by permitting the image-forming light directly projected from the projector to pass through without causing it to be diffracted, and by diffracting the image-forming light that is reflected by the reflector after having passed through the hologram film (embodiment 4, FIG. 9).

In this case, the image can be produced on the front surface side only of the hologram screen so will not to be viewed from the back surface side.

According to the third aspect of the present invention, it is desired that the reflector is arranged between the hologram film and the transparent member.

Thereby, the reproduced images are not overlapped one upon the other by the reflection by the front surface and the back surface of the transparent member, and a favorable image is obtained.

According to the fourth aspect of the present invention, the reflector is one obtained by directly coating the transparent member with a metal or a nonmetal, one obtained by sticking a metal-coated resin film onto the transparent member, or one obtained by sticking a metal foil onto the transparent member.

Thus, it is allowed to obtain a reflector which efficiently reflects the image-forming light and to easily produce the hologram screen.

As the above metal, there can be used, for example, aluminum, silver, gold or chromium. As the nonmetal, there can be used zinc sulfate or cerium oxide. As the resin film, there can be used a polyester or a polyethylene terephthalate.

As means for coating the transparent member or the resin film with a metal, there can be employed chemical plating, vacuum evaporation or sputtering.

According to the fifth aspect of the present invention, it is desired that the transparent member is a resin or a glass.

This makes it possible to cheaply obtain the hologram screen for reflecting image maintaining good quality. When the transparent member is a resin, there is obtained a hologram screen which is light in weight.

As the above resin, there can be used a polycarbonate, acrylic or vinyl chloride.

According to the sixth aspect of the present invention, it is desired that a light-scattering film is disposed on the front surface side of the hologram film to scatter the image-forming light.

This makes it possible to impart some degree of angular width to the image-forming light incident on the hologram film. Accordingly, the image is obtained as the image-forming light is diffracted by the hologram film, excellently reproducing the colors.

Further, the so-called 0-degree light traveling straight through the hologram film from the projector, can be scattered through the light-scattering film. This prevents the 0-degree light from entering into the eyes of the viewers.

According to the seventh aspect of the present invention, the reflector may be the one which totally reflects the image-forming light.

In this case, there is obtained a hologram screen of the reflection type which enables the image to be viewed from the front surface side where the projector is disposed.

According to the eighth aspect of the present invention, further, the reflector may be the one which permits part of the image-forming light to pass through.

In this case, part of the image-forming light diffracted by the hologram film transmits to the back surface side permitting the image to be viewed by even a viewer on the back surface side. Therefore, the image can be viewed from both the front surface side and the back surface side of the hologram screen.

According to the ninth aspect of the present invention, it is desired that the reflector has a light transmission factor of from 20 to 50% or a light reflection factor of from 30 to 60%. This enables the image reflected by the hologram screen to be viewed more easily.

When the light transmission factor is smaller than 20%, it may become difficult to view the image from the back surface side of the hologram screen. When the light transmission factor exceeds 50%, on the other hand, it becomes difficult to view the image from the front surface side of the hologram screen.

When the light reflection factor is smaller than 30%, it may become difficult to view the image from the front surface side of the hologram screen. When the light reflection factor exceeds 60%, on the other hand, it may become difficult to view the image from the back surface side of the hologram screen.

According to the tenth aspect of the present invention, further, it is desired that the hologram screen has a reflection-preventing film on at least either the front surface side or the back surface side thereof.

This makes it possible to prevent the reflection of the background light on the front surface or the back surface of the hologram screen. This prevents the background on the same side as the viewer from being reflected on the hologram screen and from being superposed on the image. Accordingly, there is obtained a hologram screen reflecting easy-to-see images.

Figure 10:
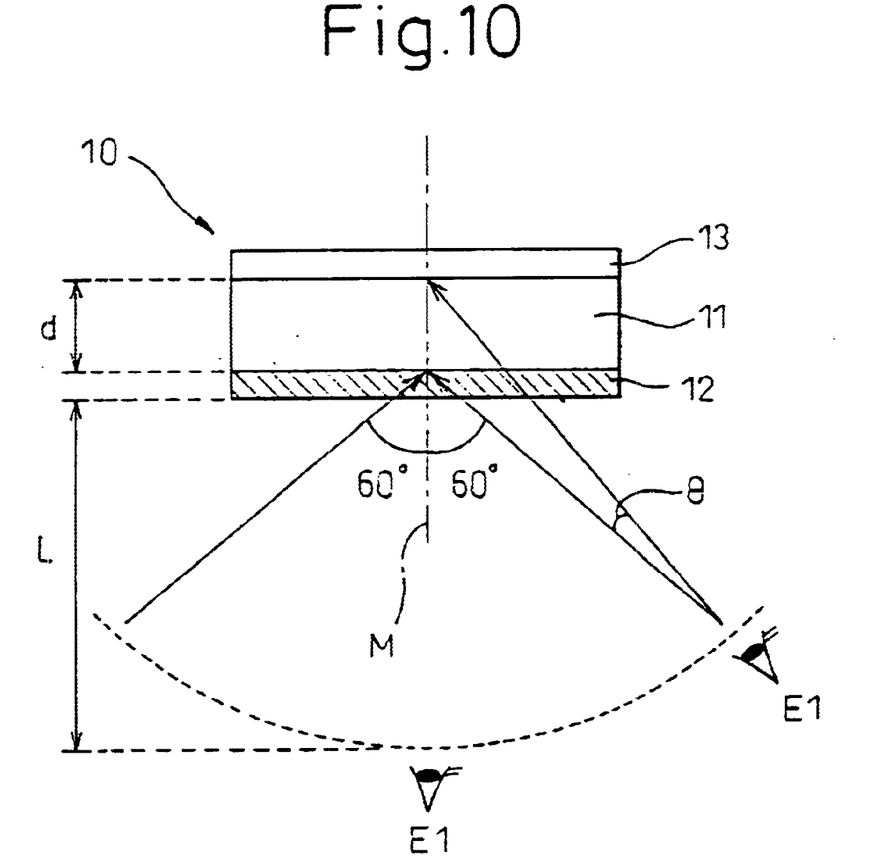
FIG. 10 is a sectional view illustrating the hologram screen according to an embodiment 5.

Next, according to the eleventh aspect of the present invention, a relationship, $$60° - \tan^{-1}\{L \times \tan 60°/(L+d)\} \leq 0.5°$$

is satisfied by a distance L between the hologram screen and the viewer on the side of the front surface thereof, and by a distance d between the hologram film and the reflector (embodiment 5, FIG. 10).

In this case, noise is not seen by the observer on the front surface side of the hologram screen, and a drop in the quality of image is avoided. When the above-mentioned relationship is not satisfied, the noise may be perceived.

Figure 11:
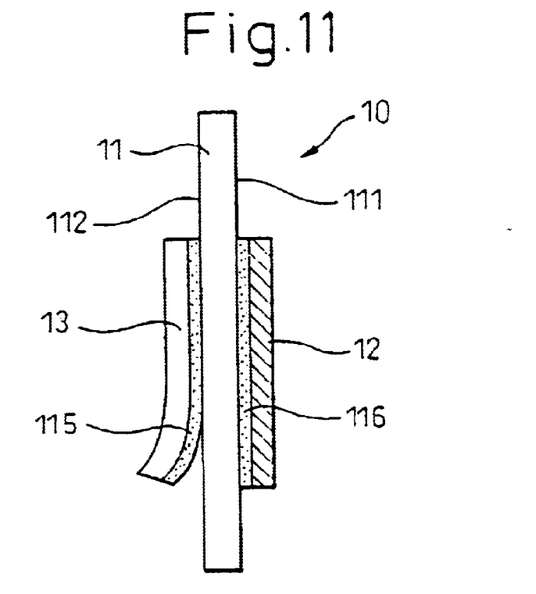
FIG. 11 is a sectional view illustrating the hologram screen according to an embodiment 6.

According to the twelfth aspect of the present invention, it is desired that the reflector is detachably attached to the transparent member and to the hologram film (embodiment 6, FIG. 11).

In this case, the hologram screen can be easily changed over into the one of the transmission type or into the one of the reflection type depending upon the use.

Figure 12:
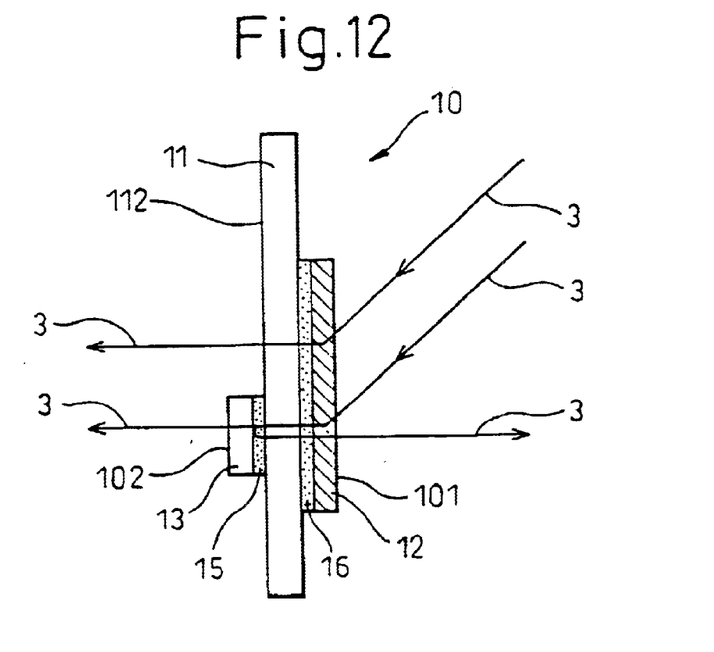
FIG. 12 is a sectional view illustrating the hologram screen according to an embodiment 7.

According to the thirteenth aspect of the present invention, it is desired that the reflector is arranged on a portion of the whole hologram film (embodiment 7, FIG. 12).

Figure 13:
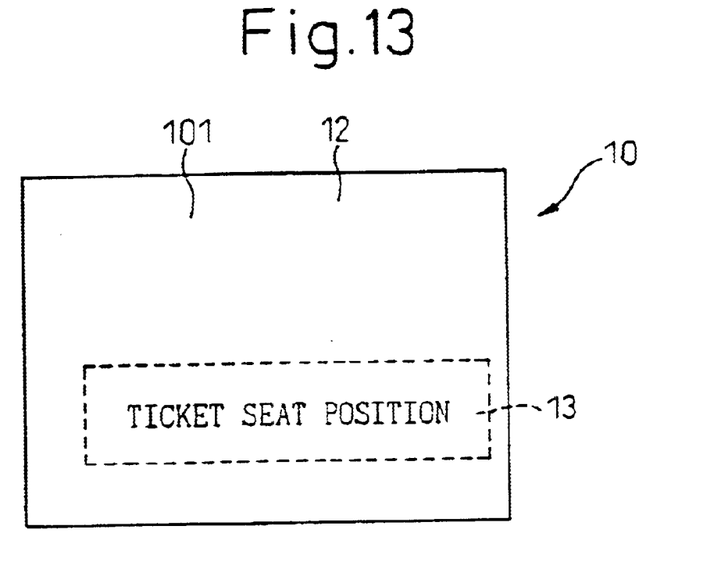
FIG. 13 is a diagram illustrating the front surface side of the hologram screen according to the embodiment 7.
Figure 14:
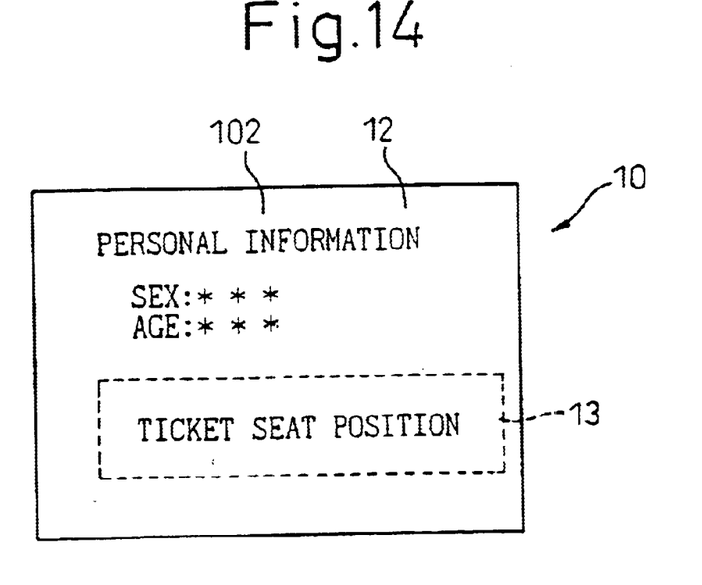
FIG. 14 is a diagram illustrating the back surface side of the hologram screen according to the embodiment 7.

In this case, it becomes possible to reflect different images on the front surface side and on the back surface side of the hologram screen (FIGS. 13 and 14).

BRIEF DESCRIPTION OF THE DRAWINGS

The above object and features of the present invention will be more apparent from the following description of the preferred embodiments when read with reference to the accompanying drawings, wherein.

DESCRIPTION OF THE PREFERRED EMBODIMENTS

Embodiment 1

A hologram screen according to an embodiment of the present invention will now be described with reference to FIGS. 1 to 6.

Figure 1:
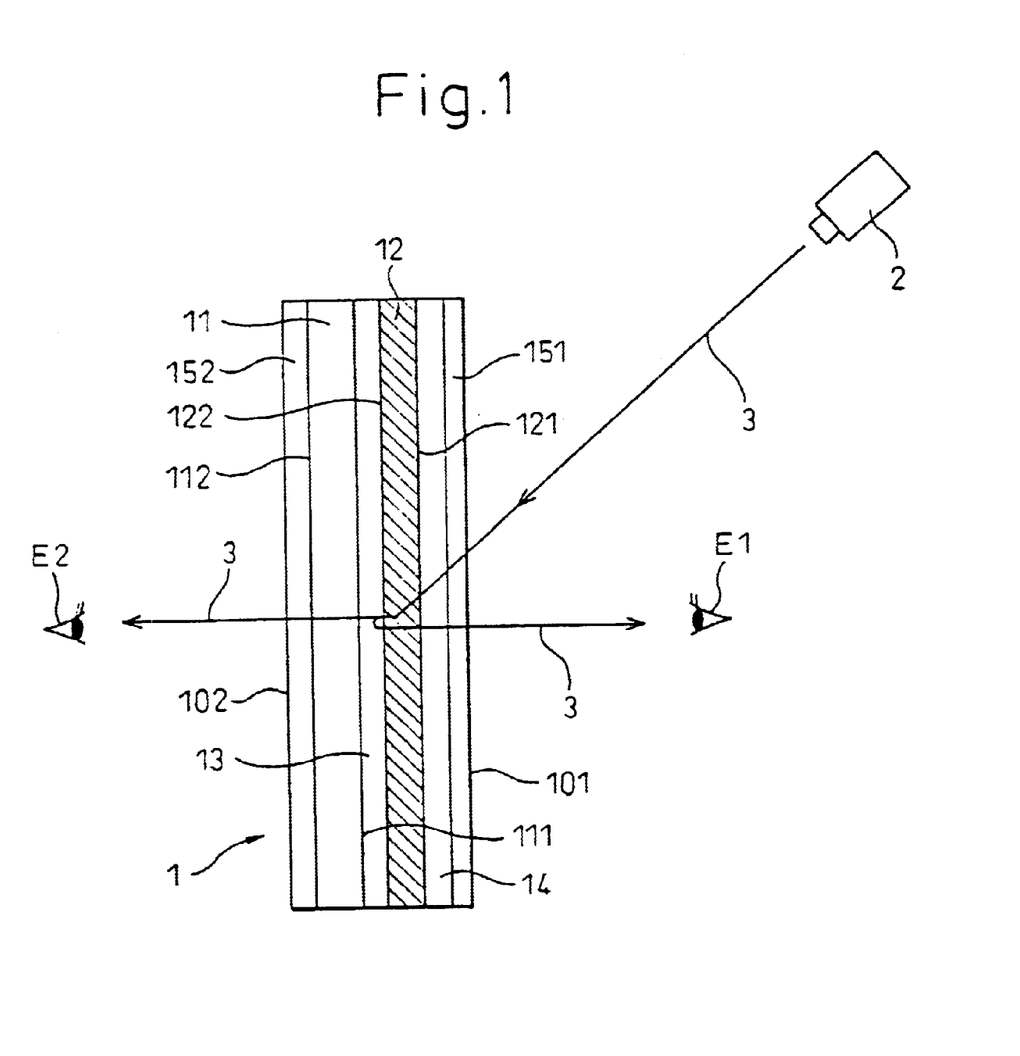
FIG. 1 is a sectional view illustrating a hologram screen according to an embodiment 1.

Referring to FIG. 1, the hologram screen 1 according to this embodiment includes a transparent member 11 and a hologram film 12 stuck to the transparent member 11, and produces image upon being projected with image-forming light 3 from a projector 2.

The hologram film 12 is the one of the transmission type. A reflector 13 for reflecting the image-forming light 3 is arranged on the back surface side 122 of the hologram film 12.

The reflector 13 is arranged between the hologram film 12 and the transparent member 11.

Referring to FIG. 1, the reflector 13 is a half-mirror permitting part of the image-forming light 3 to pass through. That is, the reflector 13 has a light transmission factor of about 40% and a light reflection factor of about 30%.

The hologram film 12 has a transmission factor of about 60%.

Figure 2:
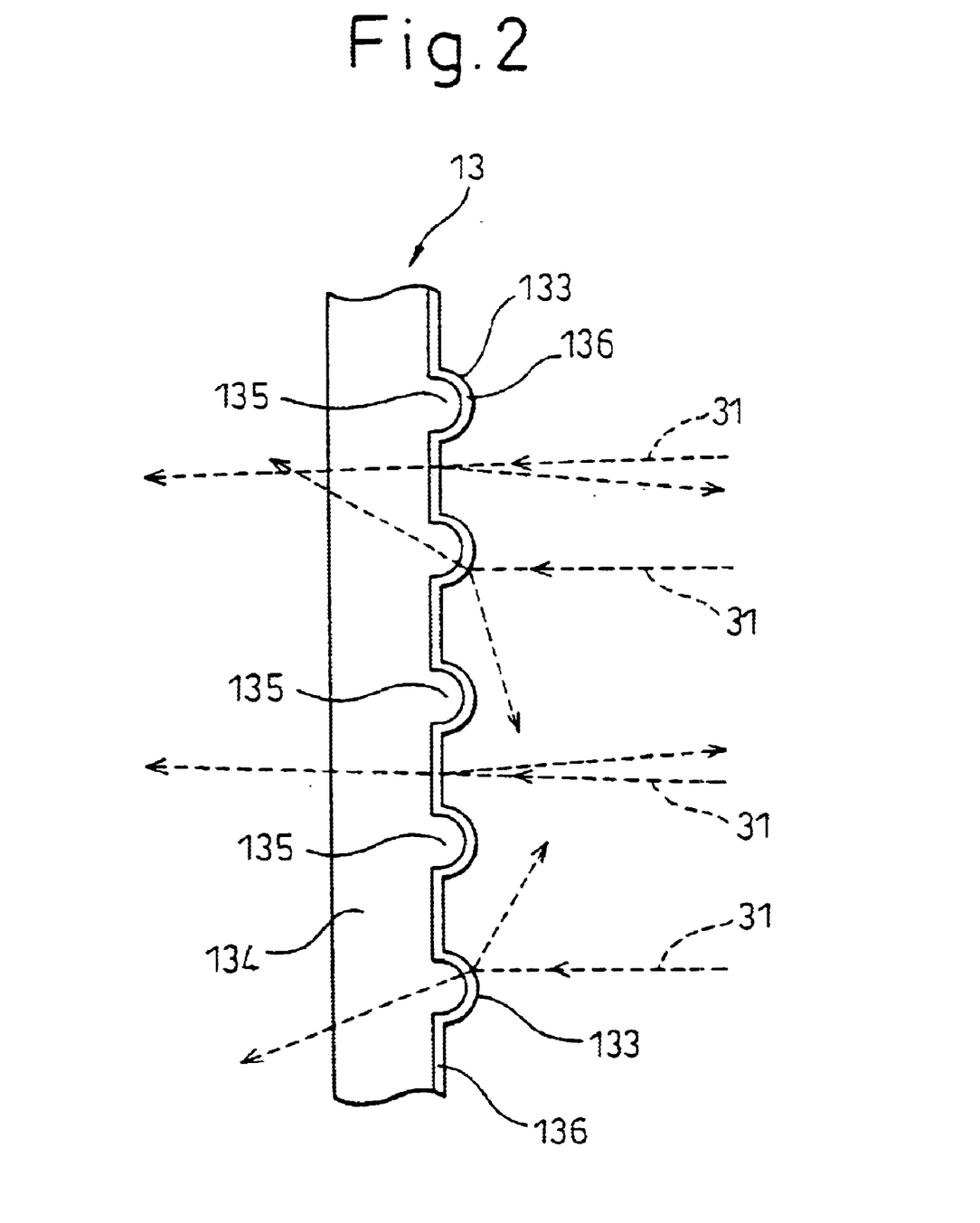
FIG. 2 is a sectional view illustrating a reflector according to the embodiment 1.

Referring to FIG. 2, the reflector 13 is formed by sticking a polyester resin film 134 coated with aluminum 136 to the transparent member 11. Aluminum 136 is deposited in a thickness of about 70 μm on the resin film 134 by chemical plating, vacuum evaporation or sputtering.

Referring to FIG. 2, the reflector 13 has a number of semispherical protuberances 133 on the surface thereof.

That is, semispherical protuberances 135 are formed in a large number on the surface of the resin film 134, and aluminum 136 is deposited on the surfaces thereof.

The projector 2 is a liquid crystal projector projecting such images as full-color or monochromatic still pictures and dynamic pictures.

The transparent member 11 is made of a polycarbonate resin.

Referring to FIG. 1, further, a light-scattering film 14 is arranged on the front surface side 121 of the hologram film 12 in order to scatter the image-forming light 3. The hologram screen 1 has reflection-preventing films 151 and 152 on the front surface side 101 and on the back surface side 102. AR films are used as the reflection-preventing films 151 and 152.

That is, as shown in FIG. 1, the reflector 13, hologram film 12, light-scattering film 14 and reflection-preventing film (AR film) 151 are successively stuck to the front surface side 111 of the transparent member 11 using an adhesive. On the other hand, the reflection-preventing film (AR film) 152 is stuck to the back surface side 112 of the transparent member 11 using an adhesive.

Figure 3:
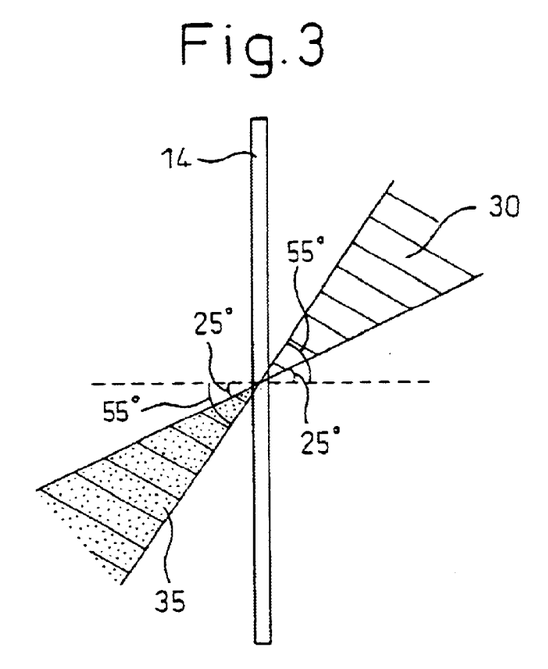
FIG. 3 is a sectional view illustrating a light-scattering film according to the embodiment 1.

As the light-scattering film 14, as shown in FIG. 3, there is used a visual range control film (Lumisty MFY-2555 produced by Sumitomo Kagaku Co. Ltd.) for scattering the incident light 30 from a particular direction only. The light-scattering film 14 is so arranged that the incident light 30 is scattered in the up-and-down direction. That is, the light-scattering film 14 scatters the incident light 30 within an upper angular range of from 25 to 55° and emits it as scattered light 35 at a lower angular range of from 25 to 55°.

Figure 4:
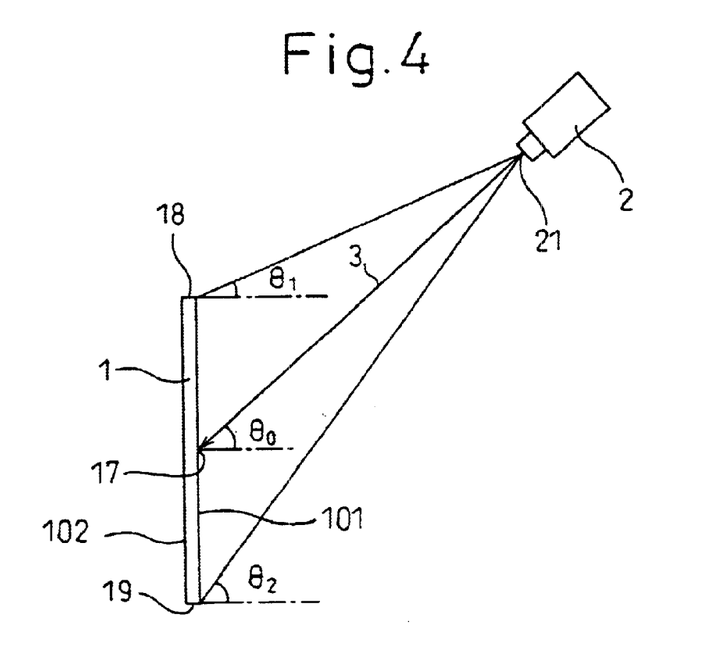
FIG. 4 is a diagram illustrating the arrangement of the hologram screen and a projector according to the embodiment 1.

Referring to FIG. 4, the projector 2 projects the image-forming light 3 onto the hologram screen 1 at an upper angular range of from 25 to 55°.

That is, referring to FIG. 4, the projector 2 is so disposed that the projection angle $\theta_1$ from the center 21 of the lens of the projector 2 to the upper end 18 of the hologram screen 1 is not smaller than 25° and the projection angle $\theta_2$ from the center 21 of the lens of the projector 2 to the lower end 19 of the hologram screen 1 is not larger than 55°.

The projection angle $\theta_0$ of the image-forming light to the center 17 of the hologram screen 1 is set to be about 35° from the standpoint of image quality and ease of production.

Next, operation and advantages of this embodiment will be described. The hologram film 12 is of the transmission type. When the image-forming light 3 is projected onto the hologram screen 1 from an upper inclined direction as shown in FIG. 1, therefore, the image-forming light 3 is diffracted and scattered by the hologram film 12, and is transmitted in nearly the horizontal direction.

Since the reflector 13 is arranged on the back surface side 122 of the hologram film 12, the image-forming light 3 is diffracted by the hologram film 13 and is passed through and, then, is reflected in nearly the horizontal direction as shown in FIG. 1.

Accordingly, the image-forming light 3 travels toward the front surface side 101 of the hologram screen 1. The viewer E1 on the front surface side 101 of the hologram screen 1 is, therefore, allowed to view the image.

As described above, the hologram screen 1 has a constitution in which the transmission-type hologram film 12 is stuck to the transparent member 11 enabling the image to be viewed from the side of the projector 2 (front surface 101). Despite of using the transmission-type hologram film 12, therefore, the hologram screen 1 works as the reflection-type hologram screen.

Namely, the above-mentioned hologram screen 1 having the function of the reflection type can be easily produced by using the hologram film 12 for producing the transmission-type hologram screen.

Accordingly, no investment needs be made and no technology needs be developed for producing the reflection-type hologram film, and the hologram screen 1 can be cheaply obtained.

Figure 5:
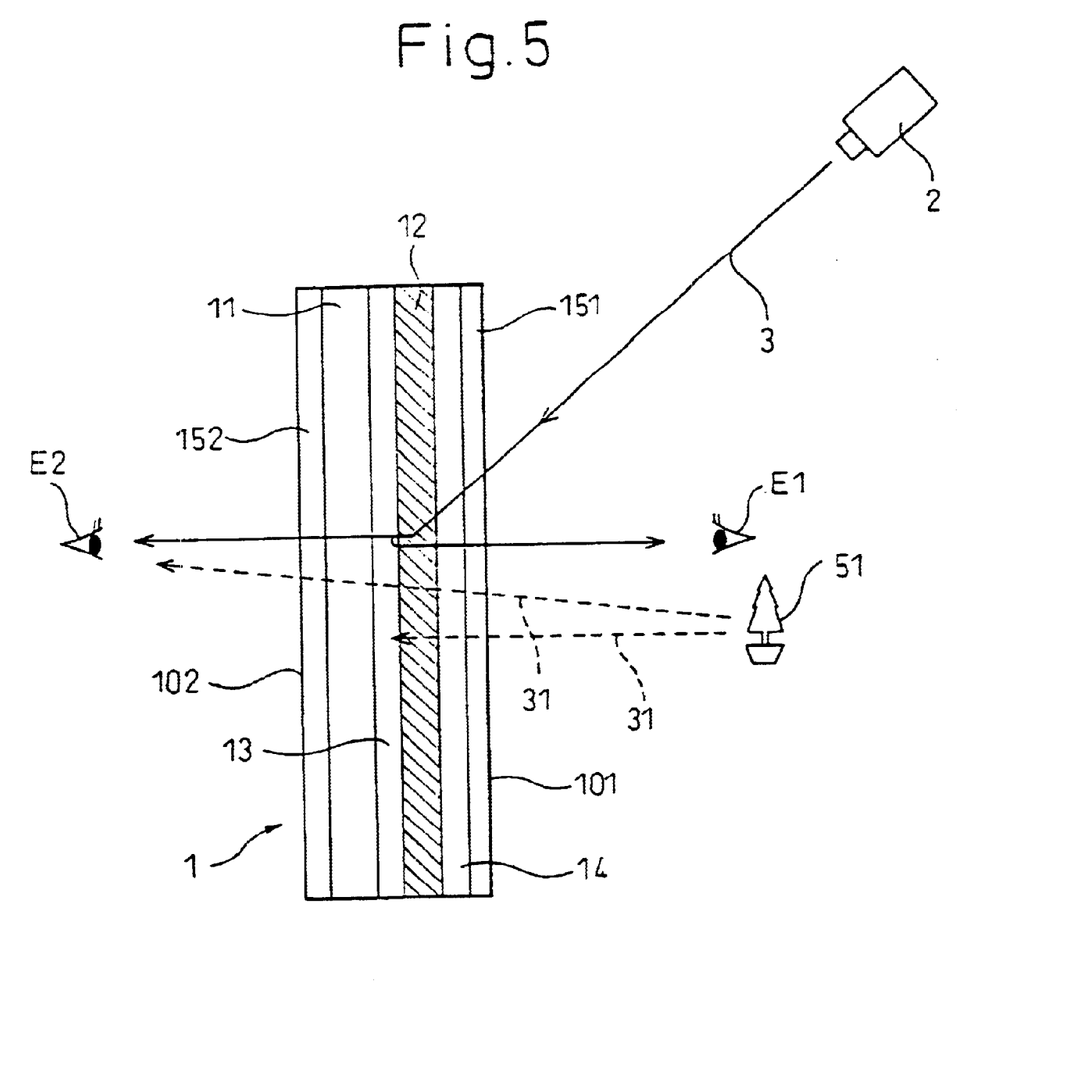
FIG. 5 is a diagram illustrating the background light on the front surface side of the hologram screen according to the embodiment 1.
Figure 6:
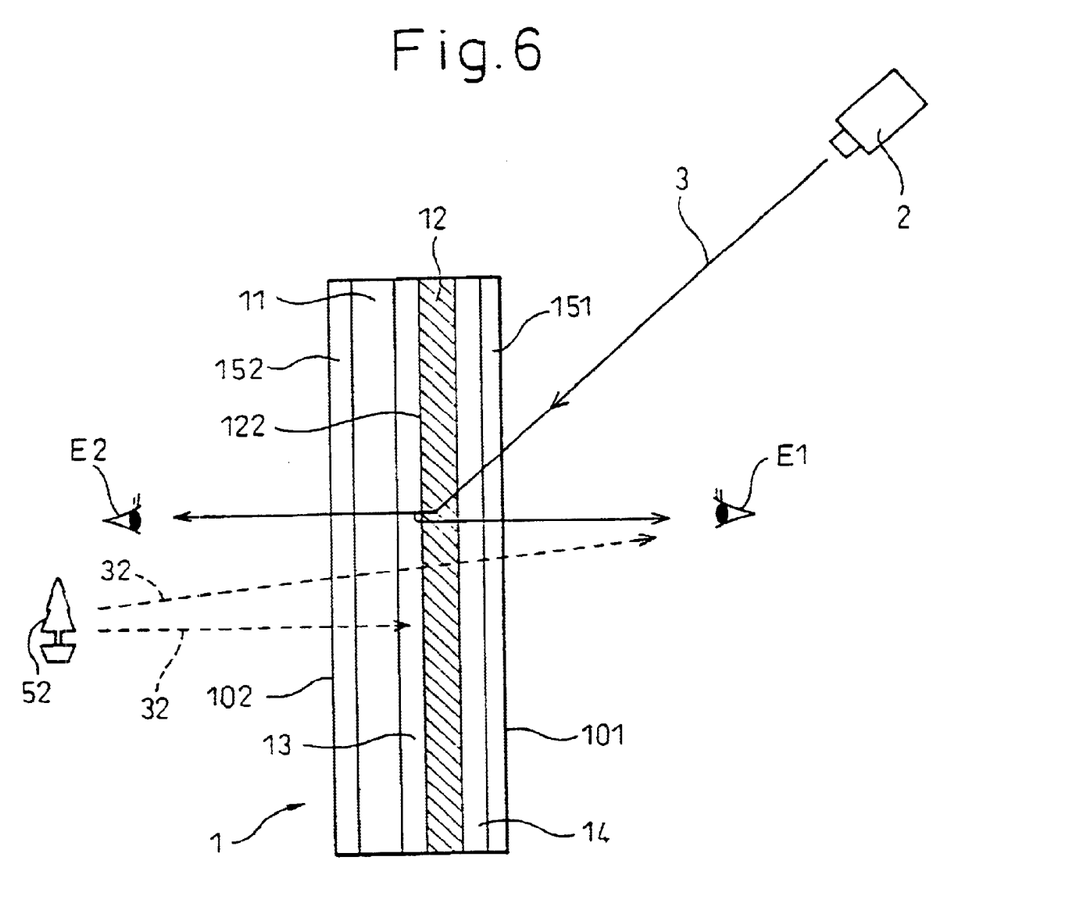
FIG. 6 is a diagram illustrating the background light on the back surface side of the hologram screen according to the embodiment 1.

Referring to FIGS. 5 and 6, the background lights 32, 31 from the sides opposite to the viewers E1, E2 pass through the hologram screen 1 to some extent. Therefore, the viewers E1, E2 are allowed to see the backgrounds 52, 51 on the opposite sides of the hologram screen 1.

Further, since the reflector 13 is arranged between the hologram film 12 and the transparent member 11, the reproduced images are not overlapped by the reflection of the front surface 111 and the back surface 112 of the transparent member 11, and a good image is obtained.

Referring to FIG. 1, further, the reflector 13 permits part of the image-forming light 3 to pass through. That is, part of the image-forming light 3 projected from the projector 2 is reflected by the reflector 31 toward the front surface side 101 of the hologram screen 1 but another part passes through the reflector 13 and goes out from the back surface side 102 of the hologram screen 1.

Therefore, part of the image-forming light 3 diffracted by the hologram film 12 passes through to the back surface side 102 letting even the viewer E2 on the back surface side 102 to view the image. Accordingly, the image can be viewed from both the front surface side 101 and the back surface side 102 of the hologram screen 1.

The reflector 13 is obtained by sticking the polyester resin film 134 coated with aluminum 136 (FIG. 2) to the transparent member 11. It is, therefore, allowed to obtain the reflector 13 which efficiently reflects the image-forming light 3 and to easily produce the hologram screen 1.

Referring to FIG. 2, further, the reflector 13 has a number of semispherical protuberances 133 on the surface thereof. Therefore, the background light 31 that has traveled straight through the hologram film 12 is scattered to a suitable degree due to the reflector 13. That is, the background light 31 that has hit the protuberances 133 of the reflector 13 is scattered being irregularly reflected and greatly diffracted. Therefore, the background light 31 travels straight through the hologram screen 1 in decreased amounts.

This prevents the viewer E2 on the back surface side 102 from viewing the image-forming light 3 and the background light 31 in an overlapped manner; i.e., the viewer E2 is allowed to easily view the image.

The transparent member 11 is made of a polycarbonate resin, is light in weight, and makes it possible to cheaply obtain the hologram screen 1 which produces images of good quality.

Further, a light-scattering film 14 is arranged on the front surface side 121 of the hologram film 12 to scatter the image-forming light 3. This makes it possible to impart an angular width of some degree to the image-forming light 3 falling on the hologram film 12. Therefore, the image obtained by the diffraction of the image-forming light 3 through the hologram film 12 excellently reproduces colors.

Further, the so-called 0-degree light traveling straight through the hologram film 12 from the projector 2 can be scattered by the light-scattering film 14. Therefore, the 0-degree light is prevented from entering into the eyes of the viewer E2.

Referring to FIG. 3, further, the light-scattering film 14 works to scatter the incident light 30 in an upper range of 25 to 55° but permits the incident light in other angular ranges to travel through straight. As shown in FIG. 5, therefore, the background light 31 in nearly the horizontal direction passes through the hologram screen 1, and the observer E2 is allowed to view the background 51 of the opposite side.

Further, the hologram screen 1 has a reflection-preventing film 151 on the front surface side 101. This prevents the reflection of the background light 31 on the front surface 101 of the hologram screen 1. Accordingly, the background 51 on the side (front surface side 101) same as the viewer E1 is not reflected on the hologram screen 1 and is not overlapped on the image.

Similarly, the hologram screen 1 has a reflection-preventing film 152 on the back surface side 102, too. As shown in FIG. 6, therefore, reflection of the background light 32 is prevented on the back surface 102 of the hologram screen 1. Accordingly, the background 52 on the side (back surface side 102) same as the viewer E2 is not reflected on the hologram screen 1 and is not overlapped on the image.

There is thus obtained the hologram screen 1 which enables images to be easily viewed.

According to the embodiment as described above, there is provided a hologram screen that is easily produced by using the transmission-type hologram film, enabling the image to be viewed from the side of the projector.

Embodiment 2

Figure 7:
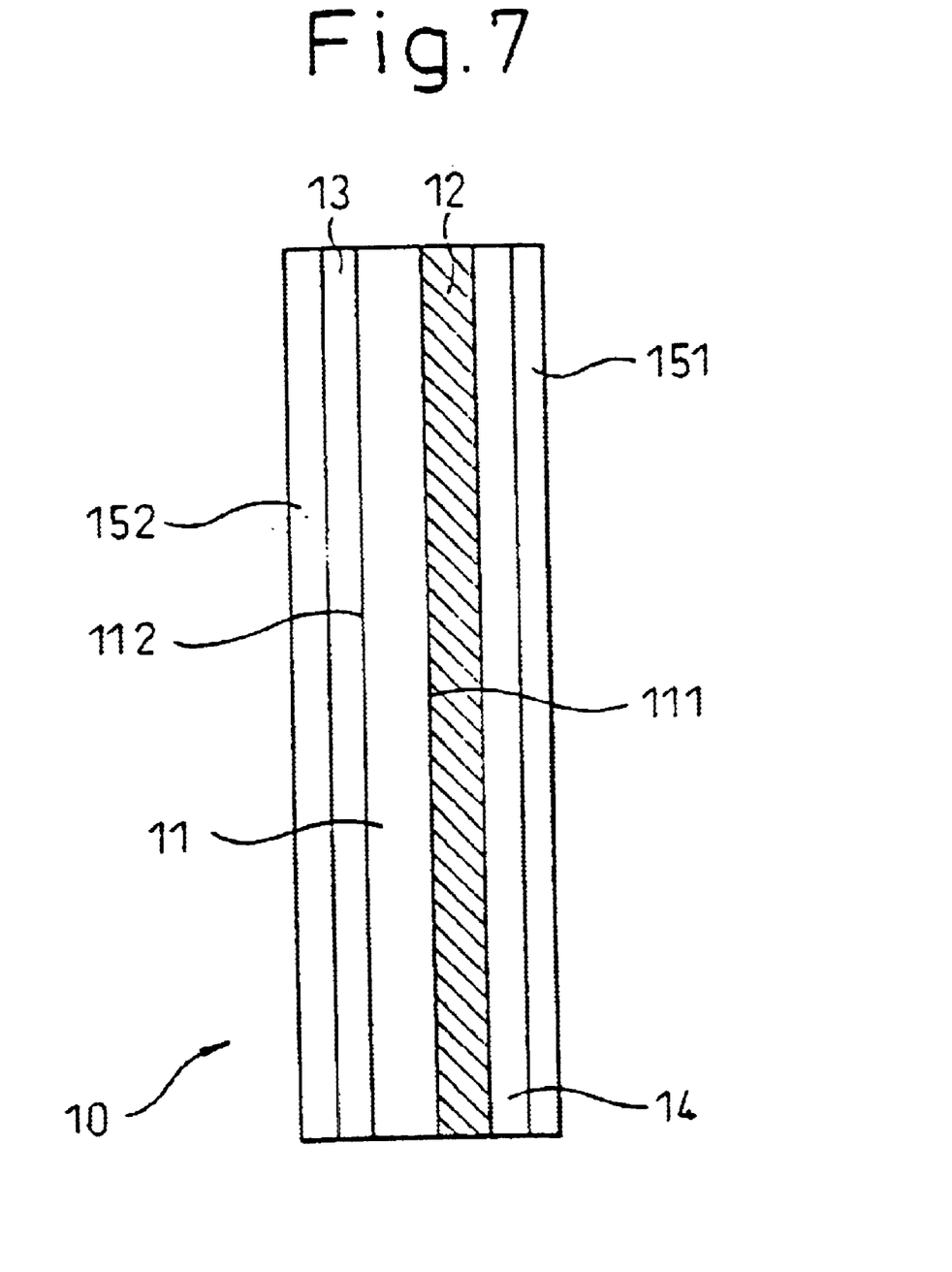
FIG. 7 is a sectional view illustrating the hologram screen according to an embodiment 2.

This embodiment deals with a hologram screen 10 having the reflector 13 arranged on the back surface side 112 of the transparent member 11 as shown in FIG. 7.

That is, the hologram screen 10 has the reflector 13 and the reflection-preventing film 152 successively stuck to the back surface side 112 of the transparent member 11. On the front surface side 111 of the transparent member 11, there are successively stuck the hologram film 12, light-scattering film 14 and reflection-preventing film 151.

In other respects, this embodiment is the same as the embodiment 1.

This embodiment, too, exhibits the same operation and advantages as those of the embodiment 1.

Embodiment 3

Figure 8:
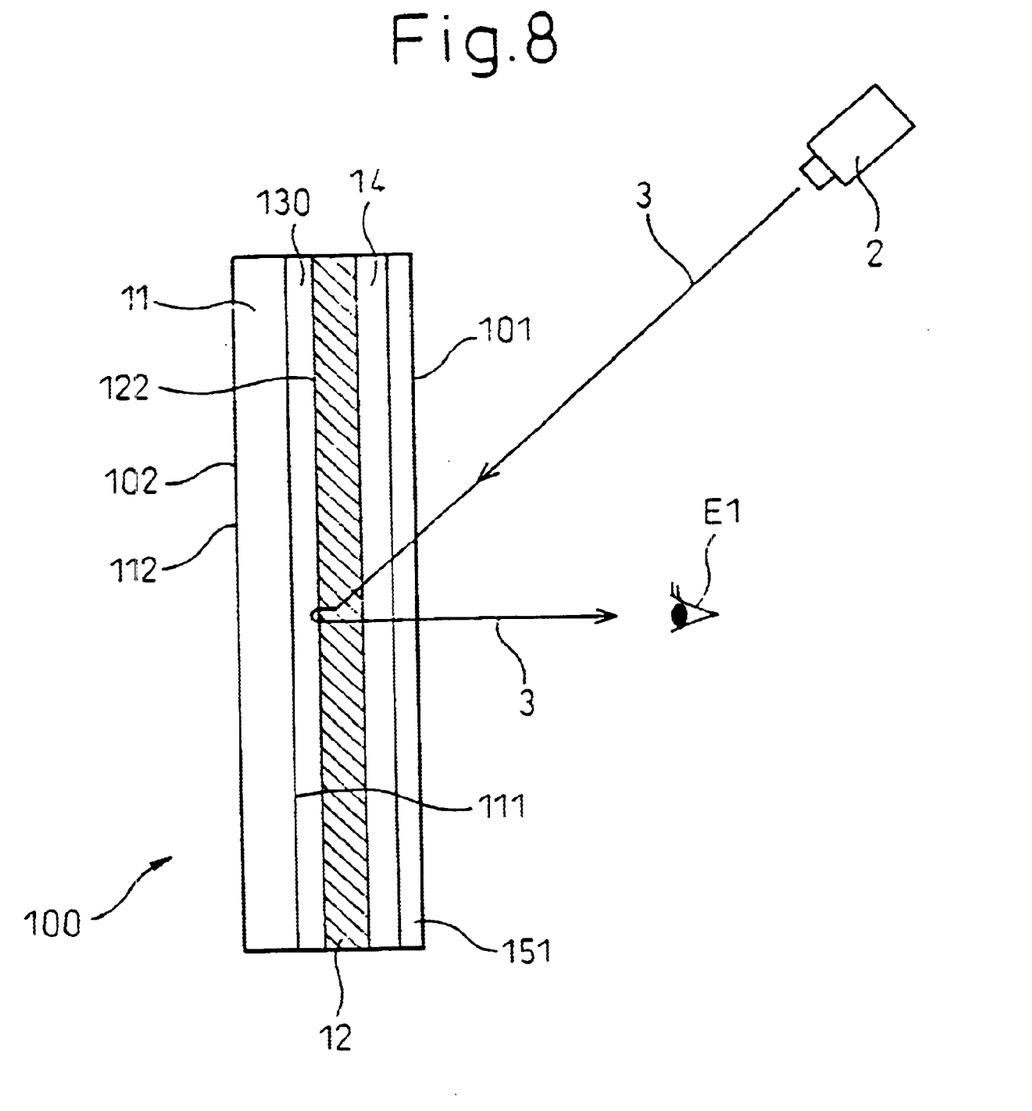
FIG. 8 is a sectional view illustrating the hologram screen according to an embodiment 3.

This embodiment deals with a hologram screen 100 using a reflector 130 which totally reflects the image-forming light as shown in FIG. 8.

That is, the hologram screen 100 has the reflector 130, hologram film 12, light-scattering film 14 and reflection-preventing member 151 that are successively stuck to the front surface side 111 of the transparent member 11. No reflection-preventing film is formed on the back surface side 112 of the transparent member 11, since it is not necessary.

In other respects, this embodiment is the same as the embodiment 1.

In this case as shown in FIG. 8, the image-forming light 3 projected from the projector 2 onto the hologram screen 100 is diffracted by the hologram film 12 and is, then, totally reflected by the reflector 130. The image-forming light 3 goes out to the front surface side 101 of the hologram screen 100 but does not go out to the back surface side 102.

Therefore, the hologram screen 100 permits only the viewer E1 on the front surface side 101, where the projector 2 is disposed, to view the image.

Namely, according to this embodiment, there is provided the reflection-type hologram screen 100 by using the transmission-type hologram film 12, enabling the image to be viewed from the front surface side 101 on where the projector 2 is disposed. It is therefore possible to cheaply and easily produce the reflection-type hologram screen 100.

In other respects, this embodiment exhibits the same action and advantages as those of the embodiment 1.

In the above-mentioned embodiments, the image-forming light is projected from an upper inclined direction. The image-forming light, however, can also be projected from, for example, a lower inclined direction.

The reflection member can be obtained by directly coating the transparent member with a metal or a nonmetal, or by sticking a metal foil onto the transparent member.

Embodiment 4

This embodiment deals with a hologram screen 10 which is so constituted as to produce the image on the front surface side 101 of the hologram screen as shown in FIG. 9 by permitting the image-forming light 3 directly projected from the projector 2 to pass through the hologram film 12 without being diffracted, and by diffracting the image-forming light 3 reflected by the reflector 13.

That is, the hologram screen 10 according to this embodiment is so constituted that the hologram film 12 is arranged front side back with respect to that of the hologram screen of the embodiment 2 (FIG. 7).

In other respects, this embodiment is the same as the embodiment 2.

In this case, the image is produced on the front surface side 101 only of the hologram screen 10 but cannot be seen from the back surface side 102.

In other respects, this embodiment exhibits the same action and advantages as those of the embodiment 2.

Embodiment 5

In this embodiment as shown in FIG. 10, the distance L between the hologram screen 10 and the viewer E1 on the front surface side 101 thereof, and the distance d between the hologram film 12 and the reflector 13, are specified as expressed by the following formula (1), $$60°-\tan^{-1}\{L\times\tan 60°/(L+d)\} \leq 0.5° \quad (1)$$

The hologram screen 10 is constituted in the same manner as in the embodiment 2 (FIG. 7).

FIG. 10 is a view of when the horizontal cross section of the hologram screen 10 is viewed from the upper direction.

As the transparent member 11, a 10 mm thick transparent acrylic plate is used. The hologram film 12 has a size of 814 mm long×610 mm high.

The image is viewed from the front surface 101 side of the hologram screen 10 usually from a distance of about four times as great as the size of height of the image, i.e., from a distance of about 2.5 meters away from the hologram screen 10 in the case of this embodiment. Namely, the distance L is generally 2.5 meters.

The angle of about 60° right and left is included in the visible range of the hologram screen 10, and the image is often viewed from an inclined direction.

Here, the hologram screen 10 produces the image as the image-forming light 3 projected from the projector is diffracted and scattered by the hologram film 12. The image is reflected by the reflector 13 and is produced on the front surface side 101 of the hologram screen 10.

Here, however, part of the image-forming light 3 from the projector 2 passes through the hologram film 12 without being diffracted or scattered, and falls directly on the reflector 13. Then, part of the image-forming light 3 that has directly fallen is scattered and reflected by the reflector 13, and this scattered and reflected light is diffracted and scattered by the hologram film 12 to produce noise.

Accordingly, there is formed the above-mentioned noise that is deviated in the direction of depth by the thickness of the transparent member 11 with respect to the normal image that is obtained as the image-forming light 3 directly projected from the projector is diffracted and scattered by the hologram film 12.

The noise is not perceived if it is overlapped on the normal image. When the hologram screen 10 is viewed from the inclined direction, however, a deviation (angle θ of deviation in FIG. 10) becomes conspicuous between the noise and the normal image, deteriorating the quality of image.

The visual angle of the hologram screen 10 is about 60° right and left. Therefore, when the image is viewed from a position of 60° right or left with respect to the direction of a normal M of the hologram screen 10, it is important that no noise is perceived and the quality of image is not degraded.

Accordingly, the distance L and the distance d are specified as expressed by the above-mentioned formula (1), and the angle θ of deviation (FIG. 10) between the noise and the normal image is suppressed to be not larger than 0.5° when the image is viewed from the position of 60° right or left with respect to the direction of the normal M of the hologram screen 10 in order to maintain the quality of image.

When the image produced by the hologram screen 10 having the above-mentioned constitution is really viewed from the direction of 60° right or left with respect to the direction of the normal of the hologram screen 10 from a distance L of 2.5 meters, no noise deviated from the normal image is perceived and the image maintains good quality.

Embodiment 6

This embodiment deals with a hologram screen 10 having a reflector 13 which is detachably attached to the transparent member 11 and to the hologram film 12 as shown in FIG. 11.

The hologram screen 10 has the reflector 13 stuck with a sticking agent 115 to the back surface side 112 of the transparent member 11, and has the hologram film 12 stuck with a sticking agent 116 to the front surface side 111 thereof. The sticking agent 115 interposed between the reflector 13 and the transparent member 11 is the one that can be detachably attached.

In other respects, this embodiment is the same as the embodiment 2.

In this case, the hologram screen 10 can be easily changed over to either the one of the transmission type or the one of the reflection type depending upon the use.

In other respects, this embodiment exhibits the same action and advantages as those of the embodiment 2.

Embodiment 7

This embodiment deals with a hologram screen 10 having a reflector 13 arranged on a portion of the whole hologram film 12 as shown in FIGS. 12 to 14.

That is, the reflector 13 has a height and a length smaller than those of the hologram film 12, and is stuck to the transparent member 11 on a portion corresponding to part of the hologram film 12.

In other respects, this embodiment is the same as the embodiment 2.

In this case as shown in FIGS. 13 and 14, different images can be produced on the front surface side 101 and on the back surface side 102 of the hologram screen 10.

That is, referring to FIG. 12, the image-forming light 3 projected from the projector and falling on a portion where the reflector 13 is not arranged, undergoes the diffraction and scattering through the hologram film 12, and passes through to produce the image on the back surface side 102 of the hologram screen 10.

Further, the image-forming light 3 falling on a portion where the reflector 13 is arranged, undergoes the diffraction and scattering in the hologram film 12, and part of it passes through and another part of it is reflected by the reflector 13. As a result, the image is produced on both the back surface side 102 and the front surface side 101 of the hologram screen 1.

The hologram screen 10 can be used, for example, for a window at a ticket sales shop to display the data.

That is, the front surface side 101 of the hologram screen 10 is faced to the purchaser and the back surface side 102 thereof is faced to the sales clerk.

The data related to the individual purchasers which should not be displayed to the purchasers, are displayed on only the back surface side 102 of the hologram screen 10 where the reflector 13 is not stuck (FIGS. 13, 14).

The data, such as reserved seat of the ticket and the like, which should be displayed to both the purchaser and the sales clerk, are displayed on both the front surface side 101 and the back surface side 102 of the hologram screen 10 where the reflector 13 has been stuck (FIGS. 13 and 14).

According to the hologram screen 10 of this embodiment as described above, different images can be displayed depending upon the front surface side 101 and the back surface side 102.

The reflector 13 may be arranged between the hologram screen 12 and the transparent member 11.

In other respects, this embodiment exhibits the same action and advantages as those of the embodiment 2.

What is claimed is:

1. A hologram screen having a transparent member and a hologram film stuck to the transparent member and producing an image by projecting image-forming light from a projector, wherein:

said hologram film is a transmission-type hologram film;

a reflector for reflecting the image-forming light is arranged on the back surface side of said hologram film; and a relationship, $$60° - \tan^{-1}\{L \times \tan 60°/(L+d)\} \leq 0.5°$$

is satisfied by a distance L between said hologram screen and the viewer on the side of the front surface thereof, and by a distance d between said hologram film and said reflector.

2. A hologram screen according to claim 1, wherein said reflector is detachably attached to said transparent member and to said hologram film.

3. A hologram screen having a transparent member and a hologram film stuck to the transparent member and producing an image by projecting image-forming light from a projector, wherein:

said hologram film is a transmission-type hologram film;

a reflector for reflecting the image-forming light is arranged on the back surface side of said hologram film;

said hologram film is so arranged as to produce an image on the front surface side of said hologram screen by permitting the image-forming light directly projected from said projector to pass through without causing it to be diffracted, and by diffracting the image-forming light that is reflected by said reflector after having passed through said hologram film; and a relationship, $$60° - \tan^{-1}\{L \times \tan 60°/(L+d)\} \leq 0.5°$$

is satisfied by a distance L between said hologram screen and the viewer on the side of the front surface thereof, and by a distance d between said hologram film and said reflector.

4. A hologram screen as in claim 3, wherein said reflector is detachably attached to said transparent member and to said hologram film.

5. A hologram screen having a transparent member and a hologram film stuck to the transparent member and producing an image by projecting image-forming light from a projector, wherein:

said hologram film is a transmission-type hologram film;

a reflector for reflecting the image-forming light is arranged on the back surface side of said hologram film;

said reflector has a light transmission factor of from 20 to 50% or a light reflection factor of from 30 to 60%; and a relationship, $$60° - \tan^{-1}\{L \times \tan 60°/(L+d)\} \leq 0.5°$$

is satisfied by a distance L between said hologram screen and the viewer on the side of the front surface thereof, and by a distance d between said hologram film and said reflector.

6. A hologram screen as in claim 5, wherein said reflector is detachably attached to said transparent member and to said hologram film.

7. A hologram screen having a transparent member and a hologram film stuck to the transparent member and producing an image by projecting image-forming light from a projector, wherein:

said hologram film is a transmission-type hologram film;

a reflector for reflecting the image-forming light is arranged on the back surface side of said hologram film;

said reflector has a light transmission factor of from 20 to 50% or a light reflection factor of from 30 to 60%;

said hologram film is so arranged as to produce an image on the front surface side of said hologram screen by permitting the image-forming light directly projected from said projector to pass through without causing it to be diffracted, and by diffracting the image-forming light that is reflected by said reflector after having passed through said hologram film; and a relationship, $$60° - \tan^{-1}\{L \times \tan 60°/(L+d)\} \leq 0.5°$$

is satisfied by a distance L between said hologram screen and the viewer on the side of the front surface thereof, and by a distance d between said hologram film and said reflector.

8. A hologram screen as in claim 7, wherein said reflector is detachably attached to said transparent member and to said hologram film.

* * * * *